Dec. 16, 1969 L. C. J. ROSCOE 3,484,558
PULSE CORRECTOR CIRCUIT FOR SINGLE FREQUENCY SIGNALING SYSTEM
Filed Dec. 30, 1966 2 Sheets-Sheet 1

INVENTOR
L. C. J. ROSCOE
BY E. J. Olinder
ATTORNEY

United States Patent Office 3,484,558

Patented Dec. 16, 1969

3,484,558

PULSE CORRECTOR CIRCUIT FOR SINGLE FREQUENCY SIGNALING SYSTEM

Lawrence C. J. Roscoe, Holmdel, N.J., assignor to Bell Telephone Laboratories, Incorporated, Murray Hill and Berkeley Heights, N.J., a corporation of New York Filed Dec. 30, 1966, Ser. No. 606,067
Int. Cl. H04m 3/22
U.S. Cl. 179—16.45 10 Claims

ABSTRACT OF THE DISCLOSURE

A circuit that controls the gating of oscillatory signal bursts to a telephone transmission line in response to D.C. input pulses, includes a modified Miller integrator circuit or timer utilizing a single transistor that establishes preselected relations between the input pulses and output signal bursts in terms of inception time, duration and repetition rate.

This invention relates to signaling systems and more particularly to systems in which signaling is effected by the transmission of bursts of alternating current.

Oscillatory burst signaling systems, such as the voice frequency signaling arrangements in telephone systems for example, typically provide means for selectively gating an oscillatory signal source to a transmission line in response to an input of direct current control signals. The performance of the gating function must conform to a number of rigid requirements primarily concerned with the relations between the input control signals and the output of oscillatory signal bursts in terms of pulse inception time, pulse duration and pulse repetition rate. Additionally, it is also desirable to provide a line cut or pre-cut function (line isolation) to ensure that the point of application of oscillatory signal bursts to the transmission line is isolated from other transmission sources on the line, such as voice transmission sources, for example, in order to avoid any possibility of interference with the signaling function. Circuits of this general type are shown in detail by W. W. Fritschi et al. in Patent 2,642,-500 issued June 16, 1953, and to a more limited extent by H. Mann in an application Ser. No. 507,458 filed Nov. 12, 1965.

In signaling systems of the type indicated, a key feature necessarily relates to the measurement of time and to the translation of that measurement into the required control signals. Heretofore, such measurement and translation has been effected by circuits of undue complexity that in turn adversely affect reliability.

Accordingly, an object of the invention is to reduce the complexity and to enhance the reliability of voice frequency signaling systems.

The objects and related objects are achieved in accordance with the principles of the invention by uniquely concentrating virtually all of the time measuring and time translation functions into a single relatively simple timing circuit which circuit includes certain of the active control elements of the signal gating circuit. More specifically, the primary timing circuit is basically a Miller integrator circuit uniquely modified to include an auxiliary feedback path. The auxiliary feedback path in turn includes an auxiliary timing circuit and also one of the active circuit elements that directly controls the operation of the gating circuit. The intimate circuit relation thus established between the gating circuit and the timing circuit, which is achieved in part by the dual function utilization of certain of the circuit components, is conducive of both circuit simplicity and reliability.

The principles of the invention as well as additional objects and features thereof will be fully apprehended from the following detailed description of an illustrative embodiment and from the drawing in which.

Figures 1, 2, 3:
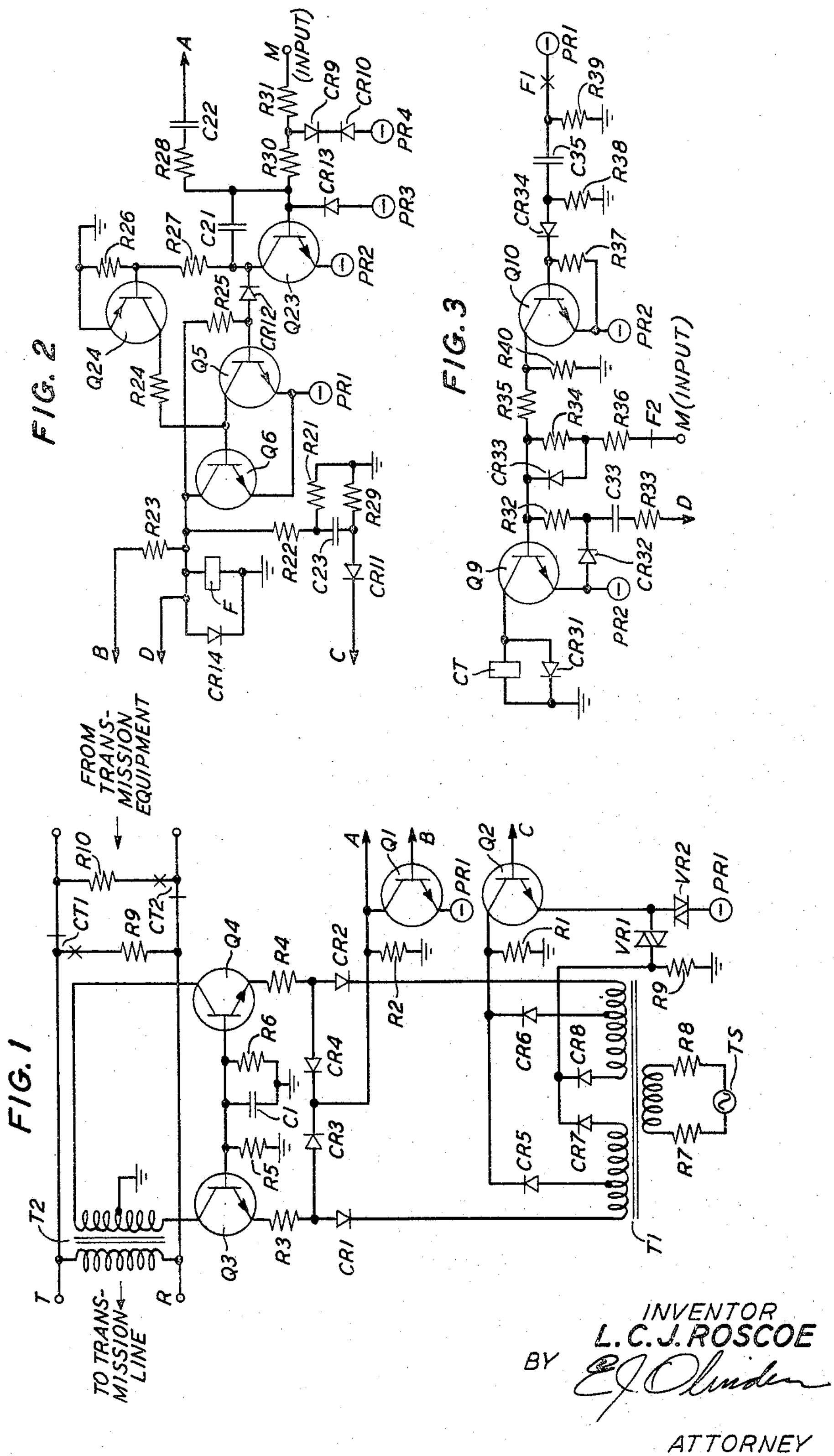
FIG. 1 is a schematic circuit diagram of a tone gate circuit in accordance with the invention.
FIG. 2 is a schematic circuit diagram of a timing circuit in accordance with the invention.
FIG. 3 is a schematic circuit diagram of a transmit cut circuit in accordance with the invention.

The basic function of the circuit shown in FIG. 1 is to provide a controlled means for gating tone bursts from an oscillatory signal source TS to a telephone transmission line TR. The tone signal is first applied by way of a transformer T1 to a gating circuit that includes diodes CR1 through CR8. Conduction of the diodes CR3 and CR4 is controlled by the output from the collector of a first control transistor Q1 and similarly, the conducting state of diodes CR5 and CR6 is controlled by the collector output of a second control transistor Q2. The output from the diode gating circuit is fed as a push-pull drive to a bridging driver amplifier which comprises a pair of transistors Q3 and Q4. A relatively high output impedance is used to minimize the bridging effect and to ensure good return loss chracteristics. The amplifier output from the collectors of transistors Q3 and Q4 is then applied to the transmission line TR by way of a transformer T2.

The diode gating connections to the secondary of transformer T1 in combination with the control transistor Q2 provide a means for changing the effective turns ratio thus making available both high and low levels of tone output. In the high level tone condition, diodes CR1, CR2, CR7 and CR8 conduct, resulting in a one-to-one ratio. For low level tone diodes CR1, CR2, CR5 and CR6 conduct, which changes the turns ratio to 1:0.24. A shift to the lower turns ratio lowers the output tone level by approximately 12 db. In the tone-off condition, diodes CR3 and CR4 are conducting, thus providing a shorting path for the applied tone, and all other diodes in the circuit are cut off. This condition results in a reduction of approximately 80 db in the level of the tone that is coupled to the transmission line TR. The performance of the gating circuit is sufficiently uniform to ensure the application of tone to the line within plus or minus .5 db of the required level under all operating conditions.

In order to avoid the possibility of line interferences while tone signals are being gated to the line, contacts CT1 and CT2 are provided so that the signal tone input may be isolated from other transmission sources, such as voice transmitters for example, which may also be on the line. The time sequence for the operation of contacts CT1 and CT2 is described hereinbelow in connection with the description of the circuits shown in FIGS. 2 and 3.

As indicated above, transistors Q1 and Q2 are the active elements that control the operation of the tone gating circuit. Inputs for transistors Q1 and Q2 are provided by the pulse correcting or timing circuit shown in FIG. 2. The timing function performed by the circuit shown in FIG. 2 is controlled by a Miller integrator circuit which comprises transistor Q23, power supply PR2 and capacitor C21. The input circuit for the base of transistor Q23 includes input point M, resistors R30 and R31, diodes CR9, CR10, CR13 and power supplies PR3 and PR4. The operation of Miller integrator or sweep circuits is well known in the art and is described for example at pages 214 and 215 in the text, Wave Generation and Shaping, by Leonard Strauss, published by McGraw-Hill Book Co., Inc., New York, N.Y., 1960. In accordance with the invention, this circuit is modified to include an auxiliary feedback path which may be traced from the collector of transistor Q23 to diode CR12, transistor Q5, transistor Q6 and thence to the base of transistor Q1. The auxiliary feedback path then continues from the collector of transistor Q1 back through capacitor C22 and resistor R28 and thence to the base of transistor Q23.

The timing functions performed by the modified Miller integrator enable the pulse correcting circuit to convert the D.C. input signals applied to the input terminal M to an appropriate drive for transistors Q1 and Q2 (FIG. 1). The timing circuit provides a delay of approximately 17 milliseconds in tone application to allow for a so-called "pre-cut" function which ensures that the transmission line is isolated from other line transmission sources for a period of 17 milliseconds prior to the time that tone is applied to the line. As a result, any transients that may still be present on the line after the operation of break contacts CT1 and CT2 will have decayed sufficiently to avoid interference with the tone signals. Additionally the circuit provides a correction for unduly short break or make intervals in the input signals applied to the terminal M.

Other functions of the pulse correcting or timing circuit include the operation of an F relay which provides supervision within the signaling unit for both free and pay calls (a function not shown) and which also operates the high level tone timing circuit. The high level timer provides for the turnoff of transistor Q2 for about 300 milliseconds at the start of continuous tone transmission.

If we neglect for the moment the function of the capacitor C22 and the resistor R28, the operation of the circuit shown in FIG. 2 may be described as follows. With input terminal M held at some preselected level such as −48 volts, for example, transistor Q23 is held in the off or nonconducting condition which in turn holds transistor Q24 off, transistor Q5 on and transistor Q6 off. Diodes CR9 and CR10 in combination with power supply PR4 clamp the input to the base of transistor Q23 to eliminate any effect on timing that may arise from differences in battery voltage or input lead resistance.

Under the conditions described immediately above, relay F is in the released condition and transistor Q1 is conducting so that the tone generated by the source TS is shorted across the conducting path through diodes CR3 and CR4. In addition, transistor Q2 is made conducting and capacitor C23 is charged to a level of approximately 21 volts. The high level timer provides for the turnoff of transistor Q2 for approximately 300 milliseconds at the start of continuous tone transmission.

The conducting state of transistor Q2 has no effect at this time. When a tone signal is to be transmitted, ground is applied to terminal M thus starting conduction of the Miller integrator transistor Q23. The signal applied to the base of transistor Q24 from the collector of transistor Q23 by way of a resistor R27 turns off transistor Q24. Transistor Q5 remains on the transistor Q6 remains off. At the conclusion of a 17 millisecond timing cycle, transistor Q23 saturates, turning transistor Q5 off in response to the signal applied to the base thereof from the collector of transistor Q23 by way of the diode CR12. Transistor Q6 is thus turned on.

The output on the collector of transistor Q6 is applied to the base of transistor Q1 by way of resistor R23 and transistor Q1 is turned off, thus gating tone to the line. The output from the collector of transistor Q6 is also applied to operate relay F, operating the make contact F1 and the break contact F2 shown in the transmit cut circuit of FIG. 3. The potential change on the collector of transistor Q6 is also applied to the base of transistor Q2 by way of a resistor R22, a capacitor C23 and a diode CR11, thus driving the base of transistor Q2 to a level of about −43 volts. This action turns transistor Q2 off which permits the transmission of high level tone. If terminal M remains at ground potential, capacitor C23 discharges to ground through resistor R29, causing transistor Q2 to turn on after an interval of about 300 milliseconds. This action restores low level tone to the line. If the signal tone is to be terminated before the end of the 300 millisecond interval and transistor Q6 turns off, transistor Q2 turns on immediately and capacitor C23 rapidly recharges to its idle condition in preparation for the succeeding tone pulse.

In the sequence of operations, described immediately above, the combination of transistors Q5 and Q6 provides a unique dual function in serving first as a threshold detector for the output of transistor Q23 and secondly as a storage or memory which registers the state of conduction of transistor Q23.

When the tone signal from the source TS is to be cut off from the line TR (FIG. 1), terminal M (FIG. 2) is returned to −48 volts thus re-energizing the integrator circuit which starts to turn off transistor Q23. As transistor Q23 comes out of conduction it does not turn transistor Q5 on inasmuch as transistor Q5 is held off by the conduction of transistor Q6 by way of a path that includes a resistor R25. When transistor Q23 is turned completely off at the end of the timing period, transistor Q24 turns off, terminating the application of base current to transistor Q6 by way of the conducting path that includes resistor R24, and transistor Q6 is turned off. The turnoff of transistor Q6 terminates the gating of tone to the line. It is in this manner that a symmetrical 17 millisecond delay is applied to the transmission of all tone pulses. As indicated above, the circuit also provides for the integration of split input pulses which may occur as the result of momentary breaks in the input signal applied to terminal M. As a result, pulse distortion is maintained at a minimal level.

In accordance with the invention, the corrections for short break or short make input signals are effected by the combination of resistor R28 and capacitor C22 in the auxiliary feedback path of the integrator circuit previously described. When tone is to be transmitted through to the line TR, transistor Q6 is conducting, turning transistor Q1 off. This action results in current flow from ground through resistor R2, capacitor C22, resistor R28 and thence into the base of transistor Q23. This current tends to hold transistor Q23 on independent of the condition of the input applied to treminal M. Specifically, if terminal M is returned to −48 volts at the same time that transistor Q1 turns off, the excess current through resistor R28 will maintain transistor Q23 in a conducting state for a period of 36 milliseconds rather than the usual 17 milliseconds. The effect of this action is to produce a minimum output tone pulse of a 36 millisecond duration. If terminal M is maintained at ground level, however, capacitor C22 discharges in about 30 milliseconds and its subsequent effect on circuit performance is negligible. It is this action that produces a pulse break correction.

A similar function at the end of a tone pulse provides make correction. In this case when transistor Q1 turns on, current flows through resistor R28 and capacitor C22 into the collector of transistor Q1. As a result, the current at the base of transistor Q23 is depleted, and if terminal M is returned to ground at this time, transistor Q23 is held off for a period of 36 milliseconds. The net effect is to prevent the retransmission of tone for 36 milliseconds. As with the break correction sequence described above, if the make interval exceeds a duration of approximately 50 milliseconds the effect of capacitor C22 is negligible.

Figure 4:
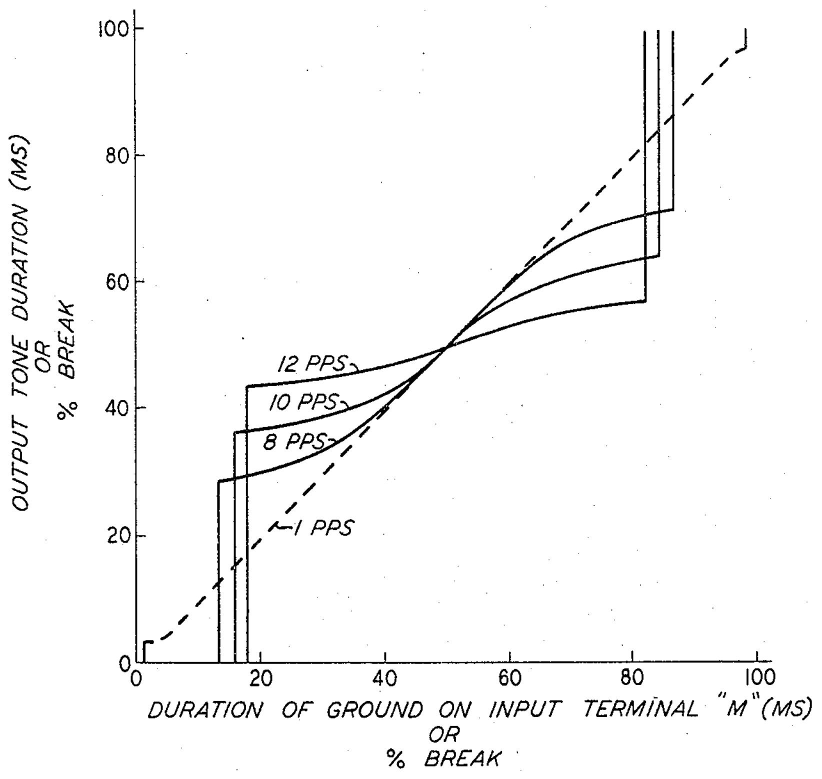
FIG. 4 is a plot of the relation between input control signals and output tone signals in a system of the type illustrated in FIGS. 1, 2 and 3.

The overall steady-state pulsing performance of the circuit is illustrated in FIG. 4, which shows a plot of nominal input-output timing relations. Under all operating conditions it is possible to maintain all of the timing functions described within approximately plus or minus 2 milliseconds of their nominal value.

The cut circuit which controls the operation of relay CT and its associated contacts CT1 and CT2 is shown in FIG. 3. The circuit provides for the operation of relay CT whenever terminal M is grounded as is the case when the transmission of tone to the line is desired. An automatic pre-cut function is provided inasmuch as tone transmission is normally delayed by 17 milliseconds as described above. If ground potential remains on terminal M, relay CT should remain operated for about 750 milliseconds in order to allow for the decay of any central office or other switching transients that may be on the line. A cut function must also be provided at the conclusion of tone transmission to prevent noise from holding up an on-hook indication. In this case it is desirable to have relay CT remain operated for a period of about 100 milliseconds.

The cut circuit shown in FIG. 3 operates as follows. When terminal M is grounded, with relay F released, transistor Q9 turns on as ground is applied to the base thereof by way of the resistors R36 and R34. The output from the collector of transistor Q9 operates relay CT with essentially no delay. Specifically, relay CT operates in about 10 milliseconds, thus providing approximately 7 milliseconds for a pre-cut interval. When relay F is operated by the pulse timing circuit of FIG. 2 in the manner described above, make contact F1 operates, connecting power supply PR1 to capacitor C35. A timing interval is established by the log 2 type timing action of resistors R38 and R39 and capacitor C35. At the termination of this interval, a signal of a sufficient magnitude is applied to the base of transistor Q10 by way of the diode CR34 to turn transistor Q10 off, which in turn holds transistor Q9 on.

At the end of a tone pulse the timing for relay CT is provided by capacitor C33 which is connected to the collector of transistor Q6 by way of the resistor R33. When tone is transmitted, capacitor C33 discharges to approximately ground level and when the tone is terminated by the turnoff of transistor Q6, the collector of transistor Q6 is driven positive which drives current through resistor R33, capacitor C33 and resistor R32 to the base of transistor Q9. Transistor Q9 is thus turned on, operating relay CT, and transistor Q9 remains conducting for about 100 milliseconds until capacitor C33 charges. At this time terminal M is at approximately −48 volts, and the current flow from the base of transistor Q9 back to terminal M improves the linearity of the timing cycle control by capacitor C33. In this way relay CT operates about 10 milliseconds after the termination of a tone pulse.

With release timing at both ends of a tone pulse, relay CT remains operated during continuous pulsing or pulse trains. The timing cycles of relay CT do not require close tolerances. The log 2 type timer comprising resistors R38 and R39 and capacitor C35 are effective, however, to hold the 750 milliseconds period to within plus or minus 100 milliseconds, and the timing provided by capacitor C33 and resistor R33 fixes the 100 milliseconds timing period to within plus or minus 50 milliseconds. These tolerances are adequate for the performance required. The pre-cut timing depends primarily on the operate time of relay CT which typically varies by an interval of plus or minus 5 milliseconds. As a result, the duration of the pre-cut interval may vary between 12 and 2 milliseconds. This interval of performance has been found to be satisfactory, inasmuch as it guarantees at least some reasonable pre-cut interval under all operating conditions.

It is to be understood that the embodiment described herein, including the specific timing intervals employed in the description thereof, is merely illustrative of the principles of the invention. Various modifications may be made by persons skilled in the art without departing from the spirit and scope of the invention.

What is claimed is:

1. Tone pulse signaling apparatus comprising, in combination, tone generating means, a conductive path for applying the output of said generating means to a transmission line, a control transistor including base, emitter and collector electrodes, means responsive to the collector output of said control transistor for shorting said path, a timing circuit including a timing transistor connected in a Miller integrator circuit configuration, means connecting the collector of said timing transistor to the base of said control transistor, means for applying an input control signal to the base of said timing transistor, combined means for ensuring a minimum duration for tone pulses applied to said line and for ensuring a minimum interpulse duration irrespective of unduly short make and break characteristics of said input control signal, said last named means comprising an R-C timing circuit connected between the collector of said control transistor and the base of said timing transistor.

2. Apparatus in accordance with claim 1 wherein said connecting means includes third and fourth transistors, means connecting the collector of said timing transistor to the base of said third transistor, means connecting the collector of said third transistor to the base of said fourth transistor, and means connecting the collector of said fourth transistor to the base of said control transistor, the combination of said third and fourth transistors performing a dual function as a threshold detector for the signal level on the collector of said timing transistor and a register for storing an indication of the state of conduction of said timing transistor.

3. Apparatus in accordance with claim 2 including a fifth transistor having the base electrode thereof connected to the collector of said timing transistor, the collector thereof connected to the collector of said third transistor, said fifth transistor being made conductive upon the inception of the turn-on interval of said timing transistor and said fifth transistor becoming nonconductive substantially simultaneous with said timing transistor, whereby the turn-off of said fifth transistor turns off said fourth transistor and turns on said control transistor to terminate the application of tone to said line.

4. Apparatus in accordance with claim 2 including a second control transistor, means responsive to the conducting state of said second control transistor for reducing the level of steady tone applied to said line after a predetermined duration, and means for controlling the conductive state of said second control transistor including a resistive element and a capacitive element connected between the collector of said fourth transistor and the base of said second control transistor.

5. Apparatus in accordance with claim 2 including means responsive to a preselected level of said input control signal for isolating a portion of said line for a preselected period before application of tone to said line during the application of tone to said line and for a preselected period after the termination of the application of tone to said line.

6. Apparatus in accordance with claim 5 wherein said isolating means includes a first relay and a second relay responsive to current from the collector of said fourth transistor, said second relay having contacts for disconnecting said first relay from said input signal.

7. Tone pulse signaling apparatus comprising, in combination, tone generating means, a conductive path for applying the output of said generating means to a transmission line, first and second control transistors, a control signal input terminal, means including a timing transistor connected in a Miller integrator circuit configuration responsive to the application of successive input signals to said terminal for applying delayed successive signals to said first and second control transistors, whereby said first control transistor successively shorts said conductive path to effect the application of correspondingly successive tone pulses of a preselected minimum duration to said line, said second control transistor being responsive to a particular preselected signal level from said applying means for reducing the level of steady tones applied to said line after a preselected duration.

8. Apparatus in accordance with claim 7 wherein said applying means further includes a timing circuit connected between the base electrode of said timing transistor and the collector electrode of said first control transistor whereby said tone pulses are maintained at a uniform length and pulse repetition rate substantially irrespective of the length and repetition rate of the signals applied to said terminal.

9. Tone pulse signaling apparatus comprising, in combination, tone generating means, a conductive path for applying the output of said generating means to a transmission line, first and second control transistors, a control signal input terminal, a timing transistor including base, collector and emitter electrodes, means including a resistive element connecting said terminal to said base electrode, a capacitive element bridged between said collector and base electrodes, first means connecting said collector electrode to the base of said first control transistor, means including a timing circuit connecting the collector of said first control transistor to the base of said timing transistor, means including a timing circuit connecting the collector of said timing transistor to the base of said second control transistor, means responsive to an output from the collector of said second control transistor for reducing the level of steady tone applied to said line after a preselected period, and means responsive to an output from the collector electrode of said first control transistor for shorting said conductive path whereby the duration of tone pulses applied to said line and the time interval between successive ones of said pulses is maintained above a preselected minimum substantially irrespective of the duration and repetition rate of signal pulses applied to said terminal.

10. Apparatus in accordance with claim 9 wherein said first means includes a dual function circuit operating as a threshold detector for the output of said timing transistor and as a register for storing an indication of the conducting state of said timing transistor.

References Cited

UNITED STATES PATENTS

| | | | |
|---|---|---|---|
| 2,696,559 | 12/1954 | Mitchell | 331—172 |
| 2,765,371 | 10/1956 | Fritschi et al. | 179—84 |
| 3,315,039 | 4/1967 | Gebhardt et al. | 179—16 |

KATHLEEN H. CLAFFY, Primary Examiner

J. S. BLACK, Assistant Examiner

U.S. Cl. X.R.

331—172